Nov. 30, 1948.  A. A. MARKSON  2,455,184
TOTALIZING DEVICE
Filed Dec. 20, 1945  2 Sheets-Sheet 1

WITNESSES:

INVENTOR
Alfred A. Markson
BY Gerald B. Tjoflat
His ATTORNEY

Nov. 30, 1948.  A. A. MARKSON  2,455,184
TOTALIZING DEVICE
Filed Dec. 20, 1945  2 Sheets-Sheet 2

WITNESSES:

Alfred A. Markson
INVENTOR
BY Gerald B. Tjoflat
HIS ATTORNEY

Patented Nov. 30, 1948

2,455,184

UNITED STATES PATENT OFFICE 2,455,184

TOTALIZING DEVICE

Alfred A. Markson, Mount Lebanon, Pa., assignor, by mesne assignments, to Hagan Corporation, Pittsburgh, Pa., a corporation of Pennsylvania Application December 20, 1945, Serial No. 636,112

2 Claims. (Cl. 137—153)

1

This invention relates to force measuring devices and more particularly to devices for measuring a plurality of independent fluid pressures and automatically summing up or totalizing said pressures.

An object of this invention is to provide a device which is relatively simple in construction and arrangement of parts, accurate yet sensitive, and which is provided with means for measuring a plurality of variable pressures and means for automatically balancing and totalizing said pressures.

A further object of the invention is to provide a device of the character referred to above in which a torque arm assembly is arranged to be acted upon by fluid pressure devices whose respective forces applied to the torque arm assembly vary by and in accordance with the value of pressures acting on said devices at any particular instant and in which the sum of said forces is automatically balanced by the force developed by a fluid pressure device acting on said torque arm assembly.

The foregoing and other objects of the invention will be readily apparent to those skilled in this art from the following description taken in conjunction with the accompanying drawings in which.

Throughout the drawings and the specification, like reference characters indicate like parts.

Figure 1:
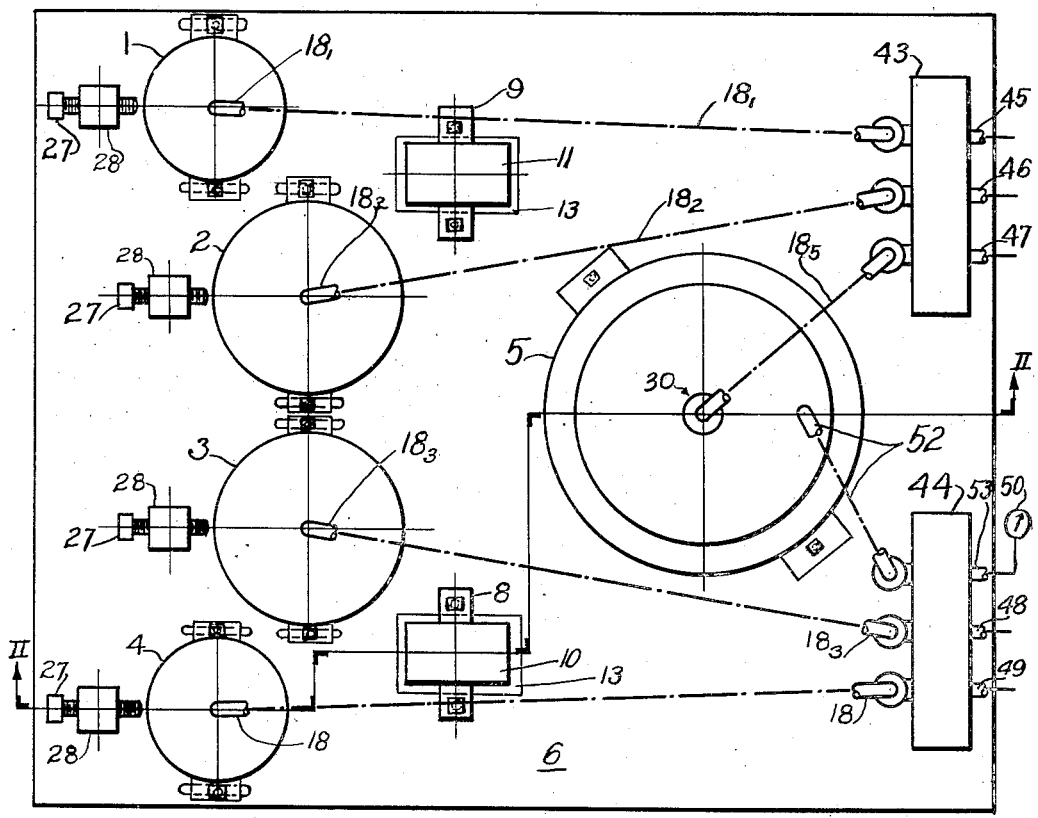
Figure 1 is a top plan view of a totalizing device of the torque type arranged and constructed in accordance with an embodiment of the invention.

The form of totalizing device illustrated as representing what now appears to be a preferred form of the invention, comprises a plurality of fluid pressure receiving units 1, 2, 3, and 4, a balancing and totalizing unit 5 all mounted on a bed plate 6, and a torque arm 7 disposed below the plate and suspended on knife edges 8 and 9 carried by the plate.

The torque arm is provided at its opposite sides with mounting stirrups 10 and 11 which overhang knife edges 8 and 9 and form a suspension for the torque arm. The legs 12 of the stirrups extend through openings 13 in the bed plate and are secured to the torque arm with bolts 14.

The totalizer may be mounted in any desired manner. As shown, it is mounted on pedestals 15 arranged as a tripod under bed plate.

Figure 2:
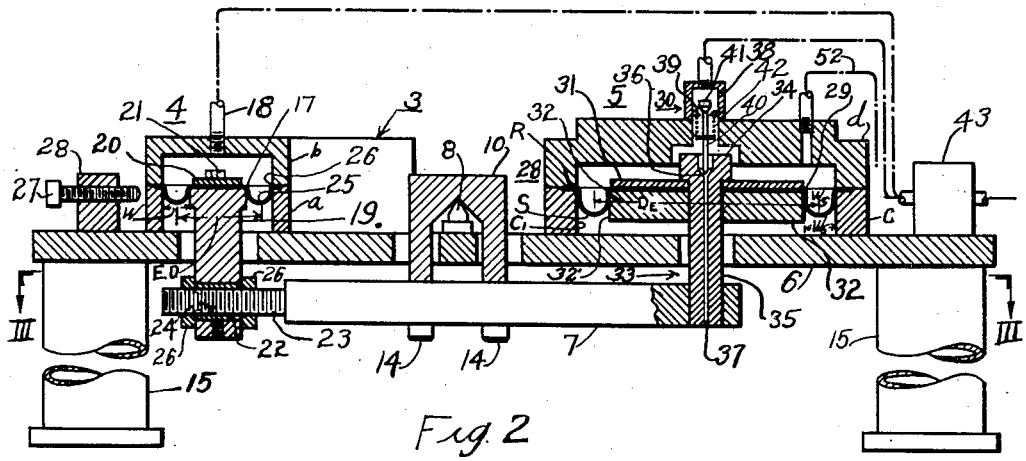
Figure 2 is a view in section of the device taken on line II—II of Fig. 1.

Pressure receiving units 1 to 4 inclusive are similar in construction, and the section of unit 4 in Fig. 2 illustrates the structural details of each. Each of these units is provided with a diaphragm but, for reasons to be stated later herein, the diaphragms of units 2 and 3 are larger than those in units 1 and 4.

As shown, unit 4 comprises a two-part diaphragm housing a, b, the lower part of a resting on bed plate 6 and a flexible diaphragm 17 whose marginal edge is clamped between the housing parts a and b, these being rigidly secured together by bolts (not shown).

The space within the upper housing part b, and above diaphragm 17 form a pressure receiving chamber, the pressure medium, such as compressed air for example, being delivered thereto by a pipe or conduit 18.

Diaphragm 17 is coupled to the torque arm 7 by means of a push rod 19. The upper end of the push rod has an enlarged head which bears on the under side of the central portion of the diaphragm. A plate 20 on the opposite side of the diaphragm is rigidly secured with a bolt 21 to the push rod. The plate and head of the push rod thus form a rigid center for the diaphragm. The lower end of the push rod is provided with an opening in which a bushing 22 is disposed for receiving a screw-threaded member 23 secured to and forming a part of the torque arm 7. Bushing 22 is provided with keys 24 that run in slots extending longitudinally of member 23 to provide for adjustment of the point of action of push-rod 19 longitudinally of torque arm.

Diaphragm 17, as stated previously, is made of non-metallic flexible material. Preferably the diaphragm is made of moldable rubber, natural or synthetic, having a cloth or fabric reinforcement. The diaphragm, as shown, has a rigid central portion formed by plate 20 and the enlarged head of push rod 19 and a slack portion 25 disposed between the rigid center and the rim 26 of the diaphragm. The slack portion is of U-shape in radial section. The slack portion 25 is concentric with the rigid central portion and preferably is preformed in the molding of the diaphragm. In order that the diaphragm may have a substantially constant effective diameter and therefore a substantially constant effective area, it is preferred that the radial width of the slack portion be equal to the radial width W of the space between the inner wall of housing part a and the opposite wall of the head of rod 19. The effective diameter of diaphragm 17 is indicated as E. D. in Fig. 2.

In the adjustment of the totalizing device, it may be found necessary to adjust the length of the torque arm of units 1 to 4, inclusive. This may be accomplished by loosening lock nuts 26, adjusting the particular unit, unit 4 for example, and its push rod in a direction lengthwise of its torque arm member 23, either towards or away from the axis of knife edges 8, to the required position and tightening the lock nuts to lock in place. To facilitate accurate positioning of units 1 to 4, positioning screws 27 mounted in fixed supports 28 secured to bed plate 6 may be provided.

Figure 3:
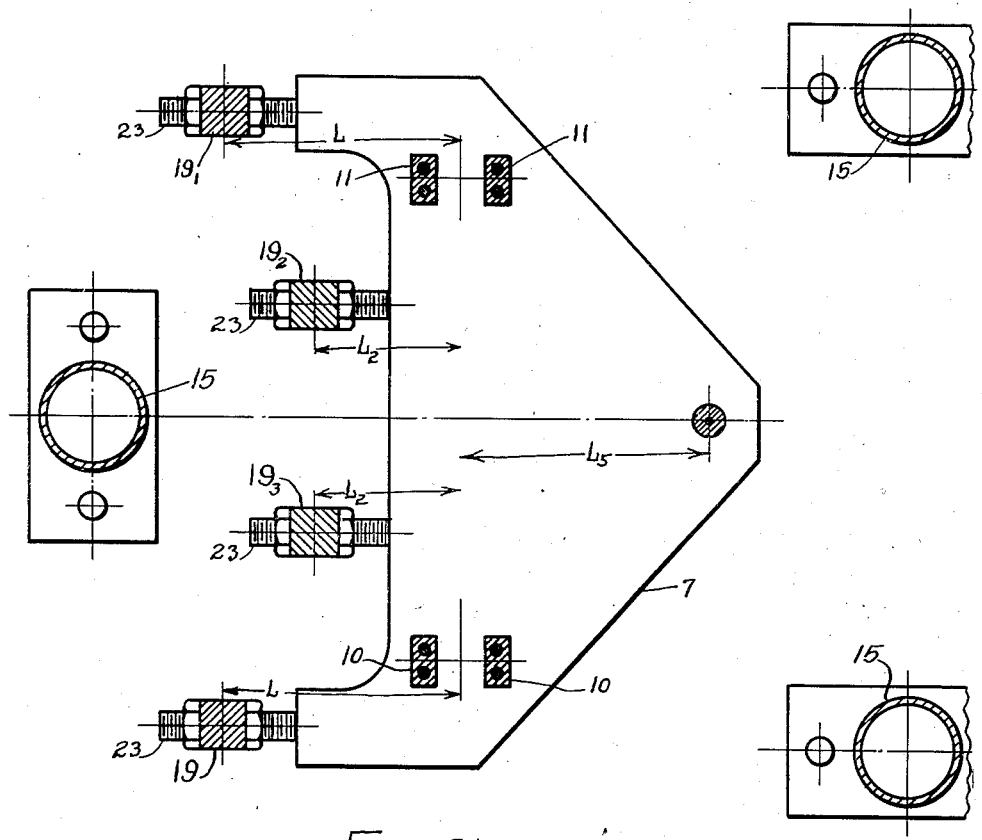
Figure 3 is a view in section of the device taken on line III—III of Fig. 2.

As may be seen in Fig. 3, the lengths of the torque arms of units 1 and 4 measured from the center of push rods 19 to the axis of knife edges 8 are equal, being indicated as "L"; the lengths of the torque arms for units 2 and 3 are also equal, and indicated as $L_2$. If the diaphragms of units 1 to 4 are of equal diameter and their torque arms are of equal length, a wider base plate and torque arm would be required. By arranging these units in the manner illustrated, a narrower base plate and torque arm may be employed, resulting in a more compact structure.

As was stated previously, the effective areas of the diaphragms of the pressure receiving units, 1 to 4, inclusive, may be equal to each other, or unequal. However, since the range of the values of pressure received by these units in pounds per sq. in. in most cases would be equal to the range of the values of pressure established by the balancing unit 5, it is apparent that the force exerted by each diaphragm of units 1 to 4 multiplied by its torque arm must be equal for the same value of pressure. For example, if the value of pressure acting on unit 1 is $P_1$ lbs./sq. in. and the effective area of its diaphragm is $A_1$ sq. in., then the force exerted by this diaphragm on the torque arm would be $P_1A_1$ and the torque developed would be $(P_1A_1)L$. It has been assumed that the effective areas of the diaphragms of units 1 and 4 are equal and that the effective areas of the diaphragms of units 2 and 3 are equal. The torque developed by units 2 and 3 at any pressure $P_2$ equals $(P_2A_2)L_2$ and the torque developed by unit 3 at any pressure $P_3$ equals $(P_3A_2)L_2$. The total torque developed by units 1 to 4, inclusive, is the algebraic sum of the torques developed by the individual units and equals $(P_1A_1)L_1+(P_4A_1)L_1+(P_2A_2)L_2+(P_3A_2)L_2$. It will be observed that the products $A_1L_1=A_2L_2$, etc.$=K$ a constant: Therefore, the sum of the torques may be expressed as $$KP_1+KP_4+KP_2+KP_3$$

If the values of $P_1$, $P_2$ $P_3$ and $P_4$ are equal at any instant then the total torque equals $N(KP)$ when N is the number of receiving units. Since the algebraic sum of the torques of units 1 to 4 may be measured, it is understood that the sign of one or more of these torques may be negative with respect to the others. As shown, the torques of these units are positive with respect to each other. The sign of the torque of one of the units 1 to 4, inclusive, would be negative when such unit is mounted to exert a force that acts upwardly instead of downwardly on the torque arm.

The range of values of pressure received by each of the units 1 to 4, inclusive, may, for example, be assumed to vary from 0 lbs./sq. in. to 60 lbs./sq. in. gauge. Under this assumption, the maximum total torque would be $N(K60)$.

Since unit 5 must develop a counter torque sufficient to balance the sum of the torques developed by the receiving units 1 to 4, inclusive, it follows that if the pressure range of its balancing pressure is to be 0 to 60 lbs./sq. in. gauge, the product of the effective area of its diaphragm ($A_5$) and torque arm length $L_5$ must equal the $$A_1L+A_4L+A_3L_2+A_4L_2 \text{ or } L(A_1+A_4)+L_2(A_2+A_3)$$

Balancing unit 5 comprises a two part housing 28 having a diaphragm 29 whose marginal portion is clamped between parts $c$ and $d$ of the housing. Part $c$ is secured to the bed plate 6. The space between the diaphragms and housing part $d$ receives fluid pressure from a supply source, such as compressed air at constant pressure, under the control of a valve 30 which is arranged for actuation by the diaphragm to maintain in the pressure space a value of pressure sufficient to balance the sum of the pressures received by units 1 to 4.

Diaphragm 29 has a rigid central portion formed by backing plates 31 and 32 disposed on opposite sides of the diaphragm and clamped firmly together by means of a push rod 33. The push rod has a head 34 which bears on plate 31 and a stem 35 which has threaded engagement with plate 32. The push rod constitutes a part of the valve assembly, being provided at its head end with an exhaust valve seat 36 and with an exhaust passageway 37 extending from the valve seat through the stem to provide a way for exhausting pressure fluid from the pressure space to the atmosphere. The lower end of stem 35 is secured to the torque arm 7.

Diaphragm 29 has a slack portion S between the rigid central portion formed by plates 31 and 32 and its rim R. The slack portion is of substantially U-shape in radial section and forms a trough or groove which is concentric with the rigid central portion. The bottom of the trough is preferably semi-circular in form and the sides thereof are substantially straight and perpendicular to the line of deflection of the diaphragm. The inner wall $C_1$ of housing part $c$ and the adjacent wall 32' of plate 32 are preferably spaced a radial distance of $W_5$ equal to the width $W_5$ of the slack portion S. Thus when the diaphragm is in place the slack portion is confined to a space of constant width whereby the effective diameter $D_E$ of the diaphragm is maintained substantially constant.

The diaphragm is of non-metallic material and preferably made from moldable rubber reinforced with fabric. The rubber may be natural or synthetic and its properties such that it remains pliable and flexible under conditions of operation and is not materially affected by changes in temperature. When the diaphragm is made, the slack portion is moulded into it in the form and dimensions desired. A diaphragm so formed has predetermined dimensions and form. Also, it will be observed when the diaphragm is in its neutral or balanced position the slack portion of the diaphragm will be in its natural or preformed position which is a feature conducive to accuracy of the device.

Valve 30 comprises a valve body 38 secured to housing part $d$ and is adapted for connection to a supply pipe having the desired pressure fluid therein, an inlet port 39 and a valve stem 40 having a valve element 41 at its upper end arranged to control the inlet port. The lower end of the valve stem is arranged to seat in the exhaust port seat 36 and control it. The valve stem is urged by a spring 42 towards the position in which both the inlet and exhaust ports are closed when diaphragm 29 is in its neutral or balanced position.

If the diaphragm moves upwardly, the valve stem is lifted—its lower end being seated in the exhaust port—and the inlet port is opened allowing the pressure in the space above diaphragm 29 to build up until the downward force exerted by the pressure ($P \times A_5$ where $A_5$ is the effective area of diaphragm 37) equals the upwardly acting force imposed by units 1 to 4, inclusive, on torque arm 7. When the equilibrium is reached, the diaphragm is in neutral position and both valve ports of valve 30 are closed. If the upwardly acting force resulting from a decrease in the force imposed by units 1 to 4 decreases, diaphragm 29 moves downwardly causing the valve seat to move away from the exhaust seat— the inlet port being closed by element 41—allowing pressure fluid to exhaust through passageway 37 until the pressure acting on the diaphragm has decreased to a value at which the force ($P_5A_5$) is balanced by the unwardly acting force, at which time the diaphragm is returned to neutral and both ports of valve 30 are closed. Thus it is apparent that whenever an unbalance occurs between ($P_5A_5$) and ($P_1A_1+P_4A_4+P_2A_2+P_3A_3$) one or the other of the valve ports of valve 30 will be opened for a time long enough to allow $P_5$ to be adjusted to the value at which balance is reestablished. Since the particular value of $P_5$ required to establish a balance is a function of the pressures acting on the respective diaphragms of units 1 to 4 inclusive, it is apparent that $K_5P_5$ is proportional to the sum of $K(P_1+P_2+P_3+P_4)$, and where $K_5$ and $K$ are constants.

To facilitate connection of the units 1 to 5 inclusive to the supply and sending pipes, connector blocks 43 and 44 are mounted on bed plate 6. Supply pipes 45, 46 and 47 are coupled to the block, and pipes $18_1$, $18_2$ and $18_5$ are utilized to connect the diaphragm chambers of units 1, 2 and 5 respectively to the supply pipes 45, 46, and 47. Block 44 is connected to supply pipes 48 and 49 to which pipes $18_3$ and 18 are connected for supplying pressure to the diaphragm chambers of units 3 and 4 respectively.

The pressures established in the diaphragm chamber of unit 5 are, as already stated, a measure of the sum of the pressures supplied to units 1 and 4. This pressure may be sent to a gauge 50 calibrated in suitable terms or may be utilized as a force to regulate or control other apparatus not shown. A sending pipe 52 is connected to the diaphragm chamber of unit 5 and to block 44. A pipe 53 leading from the block may be utilized to communicate this sending or measuring pressure to gauge 50 or to any desired point, near or remote.

From the above description of the invention, it will be apparent to those skilled in this art that various modifications and changes may be made without departing either from the spirit or the scope of the invention.

What I claim as new and desire to secure by Letters Patent is:

1. A totalizing device comprising a base member, a torque arm disposed below said base member, a pair of knife edges on said base member, one being disposed above but adjacent one side of said torque arm and the other being disposed above but adjacent the opposite side of said torque arm, the knife edges being in the same plane and extending transversely of the torque arm, a stirrup secured to each side of the torque arm, said stirrups bearing on the knife edges and suspending the torque arm therefrom, a plurality of pressure receiving units disposed on and spaced crosswise of said base member, each unit having a diaphragm and push rod connecting said diaphragm to said torque arm, the diaphragm of each unit exerting a force on said torque arm proportional to the effective area thereof and the value of pressure acting thereon, a balancing unit on said base member having a diaphragm and a push rod acting on said torque arm in a direction opposing the forces exerted on the torque arm by said pressure receiving units, said balancing unit having a valve arranged to be actuated by its diaphragm in response to movement of said torque arm out of balanced position to regulate the admission and discharge of fluid pressure to the diaphragm of said balancing unit to maintain a balance between the forces exerted by said pressure units and said balancing unit on said torque arm, said valve being in closed position when the torque arm is in balanced position, the value of the balancing pressure established in said balancing unit being proportional to the algebraic sum of the pressures received by said pressure receiving units.

2. A device according to claim 1 characterized by the fact that the pressure receiving units are adjustably mounted on said base member and that the push rods thereof are adjustable lengthwise of the torque arm whereby the sum of the products of effective area of each unit and its torque arm length may be adjusted in relation to the product of the effective area of the diaphragm of said balancing unit and the length of its torque arm.

ALFRED A. MARKSON.

REFERENCES CITED

The following references are of record in the file of this patent:

UNITED STATES PATENTS

| Number | Name | Date |
|---|---|---|
| 1,972,990 | Hardgrove | Sept. 11, 1934 |
| 2,257,577 | Rosenberger | Sept. 30, 1941 |
| 2,298,112 | Edwards | Oct. 6, 1942 |

FOREIGN PATENTS

| Number | Country | Date |
|---|---|---|
| 536,537 | Great Britain | May 19, 1941 |